United States Patent
Oran

(10) Patent No.: US 9,716,664 B2
(45) Date of Patent: Jul. 25, 2017

(54) TRACKING QUEUING DELAY AND PERFORMING RELATED CONGESTION CONTROL IN INFORMATION CENTRIC NETWORKING

(71) Applicant: Cisco Technology, Inc., San Jose, CA (US)

(72) Inventor: Dave Oran, Cambridge, MA (US)

(73) Assignee: Cisco Technology, Inc., San Jose, CA (US)

(*) Notice: Subject to any disclaimer, the term of this patent is extended or adjusted under 35 U.S.C. 154(b) by 181 days.

(21) Appl. No.: 14/558,965

(22) Filed: Dec. 3, 2014

(65) Prior Publication Data

US 2016/0164792 A1 Jun. 9, 2016

(51) Int. Cl.
*H04L 12/841* (2013.01)
*H04L 12/801* (2013.01)
*H04L 12/721* (2013.01)
*H04L 12/26* (2006.01)

(52) U.S. Cl.
CPC ........ *H04L 47/283* (2013.01); *H04L 43/0852* (2013.01); *H04L 45/44* (2013.01); *H04L 47/12* (2013.01)

(58) Field of Classification Search
CPC ... H04L 47/283; H04L 43/0852; H04L 45/44; H04L 47/12
See application file for complete search history.

(56) References Cited

U.S. PATENT DOCUMENTS

| 8,204,060 B2 | 6/2012 | Jacobson et al. |
| 8,694,675 B2 | 4/2014 | Wang et al. |
| 2002/0163363 A1* | 11/2002 | Parkin ............... G06F 5/06 326/93 |
| 2013/0060962 A1 | 3/2013 | Wang et al. |
| 2013/0219081 A1 | 8/2013 | Qian et al. |

(Continued)

OTHER PUBLICATIONS

Salehin et al., "Scheme for Measuring Queueing Delay of a Router Using Probe-Gap Model: The Single-Hop Case", IEEE Communications Letters, vol. 18, No. 4, Apr. 2014, 4 pages.

(Continued)

*Primary Examiner* — Walter Divito
(74) *Attorney, Agent, or Firm* — Edell, Shapiro & Finnan, LLC

(57) ABSTRACT

A network device that performs information centric networking (ICN) in an ICN network receives an Interest from a consumer as the Interest traverses an Interest path to a data responder. The Interest requests data by name and indicates an accumulated Interest queuing delay experienced by the Interest on the Interest path. The network device enqueues the Interest to an Interest queue and dequeues the Interest from the Interest queue, and determines a local Interest queuing delay between the enqueing and dequeuing. The network device increases the indicated accumulated Interest queuing delay by the local Interest queueing delay, and forwards the Interest along the Interest path. The network device receives a Data packet satisfying the Interest as the Data packet traverses the Interest path in reverse. The network device increases an accumulated Data queueing delay indicated in the Data packet, and then forwards the Data packet to the consumer.

20 Claims, 9 Drawing Sheets

(56) References Cited

U.S. PATENT DOCUMENTS

| | | |
|---|---|---|
| 2013/0275464 A1 | 10/2013 | Kim et al. |
| 2013/0282920 A1 | 10/2013 | Zhang et al. |
| 2013/0336323 A1 | 12/2013 | Srinivasan et al. |
| 2014/0181140 A1 | 6/2014 | Kim et al. |

OTHER PUBLICATIONS

Extended European Search Report in counterpart European Application No. 15195437.7, mailed May 12, 2016, 8 pages.

Ghali et al., "Secure Fragmentation for Content-Centric Networks", Cornell University Library, May 12, 2014, http://arxiv.org/pdf/1405.2861v1.pdf, 13 pages.

Wang et al., "An Improved Hop-by-hop Interest Shaper for Congestion Control in Named Data Networking", Aug. 12, 2013, http://conferences.sigcomm.org/sigcomm/2013/papers/icn/p55.pdf, pp. 55-60.

Zhang et al., "Named Data Networking (NDN) Project", Oct. 31, 2010, http://named-data.net/techreport/TR001ndn-proj.pdf, 26 pages.

Zhang et al., "Named Data Networking", Technical Report NDN-0019, Jun. 8, 2014, 8 pages.

Jacobson et al., "Networking Named Content", CoNEXT'09, Dec. 2009, 12 Pages.

\* cited by examiner

TRACKING QUEUING DELAY AND PERFORMING RELATED CONGESTION CONTROL IN INFORMATION CENTRIC NETWORKING

TECHNICAL FIELD

The present disclosure relates to queuing delay and congestion control in Information Centric Networking, including Named Data Networking (NDN) and Content-Centric Networking (CCN).

BACKGROUND

Effective congestion control in a data network relies on some knowledge of queueing delays experienced by data packets that traverse a network path from one point to another in the network. Information Centric Networking (ICN) involves forwarding Interests that request data by name to a data responder, and forwarding Data packets that satisfy the Interest to a consumer along a reverse of a path traversed by the Interest.

DESCRIPTION OF EXAMPLE EMBODIMENTS

Overview

Figure 1:
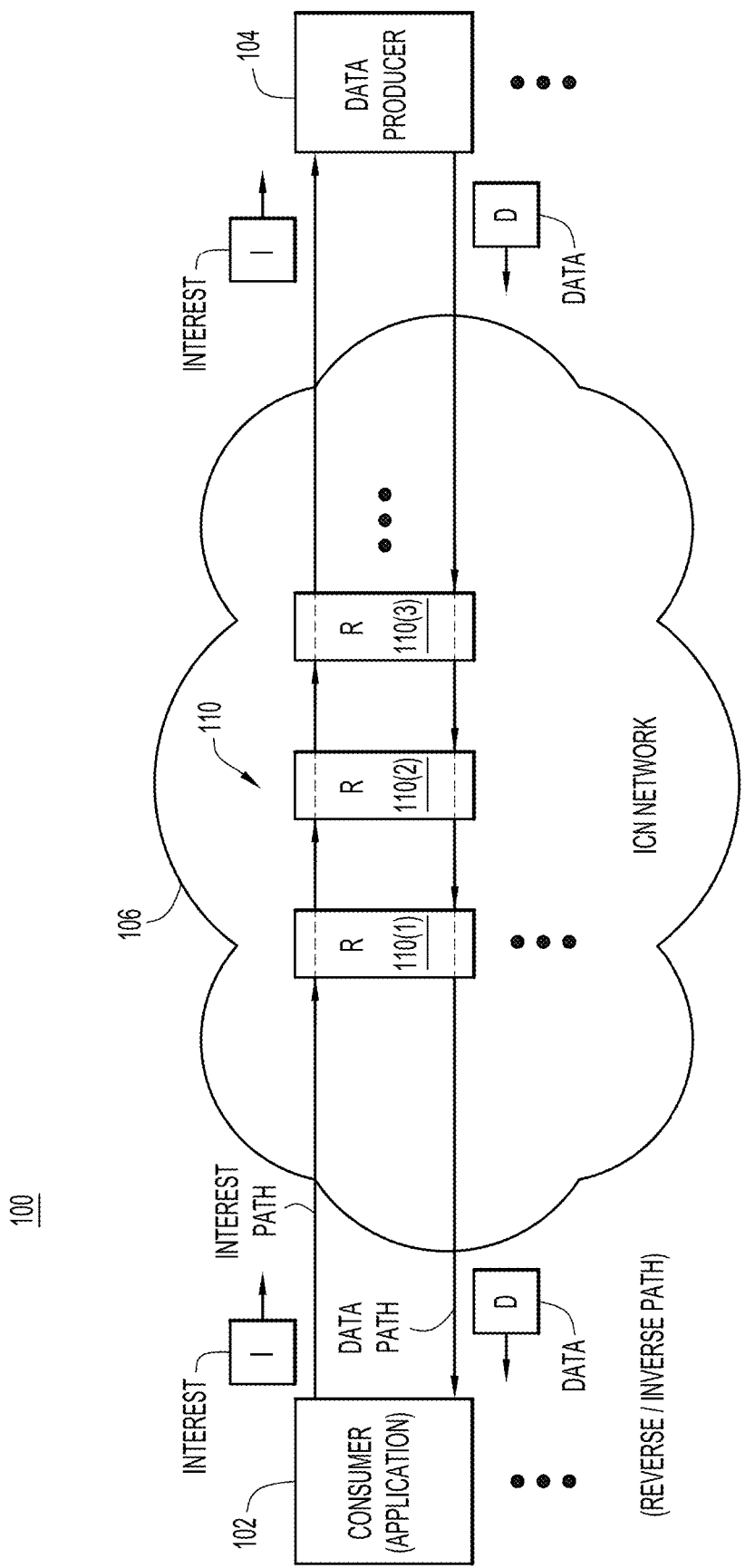
FIG. 1 is a diagram of an Information Centric Network (ICN) environment in which embodiments directed to determining, tracking, reporting, and using accumulated Interest/Data packet queueing delay may be implemented, according to an example embodiment.

A network device, among network devices configured to perform information centric networking (ICN) in an ICN network, receives an Interest from a consumer as the Interest traverses an Interest path to a data responder. The Interest requests data by name and indicates an accumulated Interest queuing delay experienced by the Interest on the Interest path. The network device enqueues and dequeues the Interest to and from an Interest queue, respectively, and determines a local Interest queuing delay between the enqueing and dequeuing. The network device increases the indicated accumulated Interest queuing delay in the Interest by the local Interest queueing delay, and forwards the Interest along the Interest path. The network device receives a data packet that satisfies the Interest as the data packet traverses a data path in reverse of the Interest path. The data packet indicates an accumulated data queuing delay experienced by the data on the data path. The network device enqueues the data packet to a data queue and dequeues the data packet from the data queue. The network device determines a local data queuing delay between the enqueuing of the data packet and the dequeuing of the data packet, increases the indicated accumulated data queuing delay in the data packet by the local data queuing delay, and forwards the data packet along the data path.

Example Embodiments

Information-Centric Networking (ICN) uses stateful (i.e., state-based) forwarding of Interest and Data packets within an ICN network, as will be described in detail below. Examples of ICN include both Named Data Networking (NDN) and Content-Centric Networking (CCN). Embodiments presented herein track Interest and Data packet queuing delays and exploit active queue management (AQM), where available in ICN networks to improve congestion control and, correspondingly, performance in terms of throughput and latency. Conventional ICN networks do not take full advantage of information regarding queueing delays experienced by the Interest and Data packets in ICN congestion control nodes for more effective congestion control.

The embodiments presented herein determine, track, and report an accumulated round-trip queueing delay experienced in Interest/Data exchanges. An application running on an ICN network then uses the reported accumulated round-trip queueing delay to determine whether longer-than-expected round-trip times (RTTs) for the Interest/Data exchanges are due to propagation/serialization delay, application processing delay, or queueing delay (each defined below). Further, a relatively large portion of an RTT allocated to accumulated round-trip queuing delay indicates indirectly that congestion is occurring in at least one queue in the ICN network and packet drops may be imminent; this informs network layer congestion control in client devices to reduce packet transmission rates. The embodiments also support reporting of accumulated round-trip queuing delays with fine-grained granularity over a relatively large dynamic range of delay, which enables a more intelligent and fine-grained approach to congestion control, e.g., using a multiplicative decrease coefficient that is scaled to the reported accumulated round-trip queuing delay instead of a fixed value of, e.g., 0.5, as is used in some conventional approaches. In summary, embodiments presented herein determine, track, and report the accumulated round-trip queuing delay experienced by Interest/Data exchanges in an ICN network. The reported delay may then be used for intelligent, fine-grained congestion control.

With reference to FIG. 1, therein is a block diagram of an example ICN environment 100 in which embodiments to determine, track, report, and then use Interest/Data packet queuing delays may be implemented. Such embodiments apply equally to both NDN and CCN, which use stateful forwarding that bases packet switching and/or routing on a name of content in a packet. ICN environment 100 includes at least one consumer application 102 (also referred to simply as "consumer" 102 or "requestor" 102) to request data, at least one data producer 104 to store and produce the data responsive to the requests, and an ICN network 106 including multiple network nodes/devices 110 (e.g., nodes (110(1), 110(2), and 110(3)) to route the data requests and data between the consumer application and the data producer. Network nodes 110 may be network routers or switches, for example.

In ICN environment 100, communication between consumer 102, data producer 104, and nodes 110 may include exchanges of two types of packets or messages: Interest (I) and Data packet (D). Both types of packets/messages carry a name that identifies a piece of data (i.e., a data object) that can be transmitted in one Data packet. Consumer 102 puts the name of a desired data object into an Interest and sends the Interest to producer 104 along an Interest or forward path through ICN network 106. Nodes 110 use this name to forward the Interest toward data producer 104 along the Interest path. Path segments between adjacent nodes 110 are referred to as "path links" or simply "links."

If the Interest reaches one of nodes 110 that has the requested data already stored therein (for example, because of a previous request for the same data object), the node 110 will return a Data packet that contains the data object back to consumer 102 along a Data path. The Data packet includes the name of the data/content together with a signature by the producer's key that binds the name to the content. If no node 110 includes the data to satisfy the Interest, the Interest will be forwarded all the way to producer 104, and producer 104 will return the requested data in the Data packet via network 106. The one of either the node 110 or producer 104 that returns the requested data is referred to herein as the "data responder" with respect to the Interest. The returned Data packet follows in reverse the Interest path back to consumer 102. Thus, the Data path is also referred to as the "reverse path" or the "inverse path" of the Interest/forward path. The forwarding of the Interest along the Interest path and of the Data packet along the reverse path by each node 110 is based on the name of the data, not source and destination addresses as used, e.g., with Internet Protocol (IP) routing.

A round-trip time (RTT) for an Interest/Data exchange in environment 100 is a period of time between a time when consumer 102 issues or sends the Interest and a time when the consumer receives the Data packet that satisfies the Interest. The RTT is a summation of the following contributory time delays: an accumulated Interest queueing delay (AIQD); an application processing delay (or simply "processing delay"); an accumulated Data queueing delay (ADQD); and an accumulated packet propagation time of all the links on the path.

An Interest may experience an incrementally increasing AIQD as the Interest traverses nodes 110 along the forward/Interest path from consumer 102 to the data responder (either data producer 104 or one of nodes 110 that has the requested data). The AIQD is a summation of local Interest queueing delays (or sojourn times) experienced by the Interest in respective ones of nodes 110 traversed by the Interest.

The processing time is a turn-around time in the data responder, i.e., the time between when data responder receives the Interest and when the data responder sends the Data packet that satisfies the Interest.

A Data packet experiences an incrementally increasing ADQD as the Data packet traverses nodes 110 along the reverse/Data path (that is a reverse or inverse of the Interest path) from the data responder to consumer 102. The ADQD is a summation of local Data queueing delays experienced by the Data packet in respective ones of nodes 110 traversed by the Data packet.

The propagation delay is the transit time of the Interest/Data packet in connections or links of ICN network 106.

In an example Interest/Data exchange, an Interest traverses nodes 110(1), 110(2), and 110(3) and experiences respective local Interest queueing delays A, B, and C milliseconds (ms) in those nodes along the forward path, such that AIQD=A+B+C ms. A data responder introduces a processing delay of D ms to respond to the Interest. The Data packet traverses nodes 110(3), 110(2), and 110(1) and experiences respective local Data queueing delays E, F, and G ms in those nodes along the reverse path, such that ADQD=E+F+G. Thus the Interest/Data exchange incurs an accumulated round-trip queueing delay (ARTQD), where ARTQD=AIQD+ADQD (i.e., A+B+C+E+F+G), and a RTT given by the equation:

$$RTT = ARTQD + \text{the processing delay (i.e., } D\text{)} + \text{the propagation delay.}$$

For nodes 110 operating in a data center, an example local Interest queueing delay in one of the nodes may be on the order of several microseconds. On the other hand, for nodes 110 operating on the Internet, an example local Interest queueing delay may be on the order of several milliseconds.

The manner in which congestion control operates in ICN is now discussed briefly. Unlike the Internet Protocol (IP) family of protocols, which relies on end-to-end congestion control (e.g. Transmission Control Protocol (TCP), Datagram Congestion Control Protocol (DCCP), and Stream Control Transmission Protocol (SCTP)), ICN employs hop-by-hop congestion control. There is a per-Interest/Data state at every hop (e.g., at every network device, such as a switch or a router) of the path and, therefore, for each outstanding Interest, bandwidth for Data packets returning on the inverse path can be allocated. In one example, allocation is performed using simple Interest counting—by accepting one Interest from a downstream node; implicitly this provides a guarantee (either hard or soft) that there is sufficient bandwidth on the inverse path to return one Data packet. Embodiments presented herein leverage two underlying capabilities of ICN. First, ICN Interest and Data packets have a flexible and extensible encoding. This permits an inclusion of additional fields in the Interest and Data packets that are sufficiently large to indicate AIQDs and ADQDs with fine-grained granularity over wide dynamic ranges, for both the forward (i.e. Interest) path and the inverse (i.e. Data) path. Second, AQM algorithms are in general capable of either estimating, or in some cases accurately measuring and computing, a given queue delay, i.e., the time a packet resides in a given queue before being transmitted from the queue (e.g., a time before being placed on a hardware transmit ring, which is assumed to be relatively short and close to constant).

Leveraging the two aforementioned ICN capabilities, embodiments herein provide consumer 102 a way to directly obtain a report of the accumulated round-trip queueing delay for the round trip of an Interest/Data packet, and decompose that delay into separate forward and inverse accumulated queuing delays (i.e., the AIQD and AIQD, respectively). In the embodiments, as an Interest traverses nodes 110 along the forward path, each time the Interest encounters a queue in a given node, a field in the Interest that indicates the AIQD is increased by a local Interest queue delay associated with that queue. Eventually, when the Interest reaches a data responder (either producer 104, or an intermediate one of nodes 110 having a cache of the data), the indicated AIQD has accounted for all of the local Interest queue delays experienced by the Interest along the forward path, and thus the indicated AIQD is at its maximum value for that forward path. This maximum AIQD value is copied into a corresponding field in the resulting Data packet by the data responder. As the Data packet traverses a reverse path back to consumer 102, each time the Data packet encounters a queue in a given one of nodes 110, another field in the Data packet that indicates the ADQD is increased by a local Data queue delay associated with that queue.

As described above, the embodiments presented herein keep track of accumulated queuing delays along both the forward and reverse paths, i.e., the AIQD and ADQD, respectively. To do this, a new field is defined in the Interest, and two new fields are defined in the Data packet, as follows: the Interest includes a new field that contains or indicates the AIQD; and, the Data packet includes (i) a new field that indicates the ADQD, and (ii) a new field that copies the indicated AIQD (from the Interest received at the data responder). In addition, the Data packet may also include a third new field that indicates the processing delay experienced at the data responder.

Figure 2A:
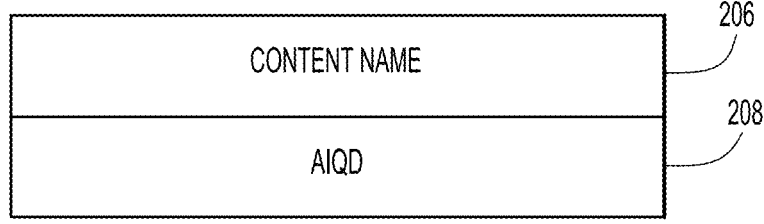
FIG. 2A is an illustration of an Interest packet, according to an example embodiment.

With reference to FIG. 2A, there is an illustration of an example of an Interest packet 200 (i.e., Interest 200) formatted to support the embodiments presented herein. Interest 200 includes: a content name 206 of the requested data; and a field 208 to carry an AIQD value. In certain embodiments, Interest 200 may also include a selector. In a given Interest that traverses ICN network nodes 110, AIQD 208 is increased by the local Interest queuing delay experienced at each node. AIQD may be represented as a multi-bit integer field that spans a dynamic range of AIQD values. In an embodiment, AIQD 208 may be represented as a 32-bit integer field, where the least-significant-bit (LSB) is one or several microseconds. Other bit-widths and timing resolutions are possible.

Figure 2B:
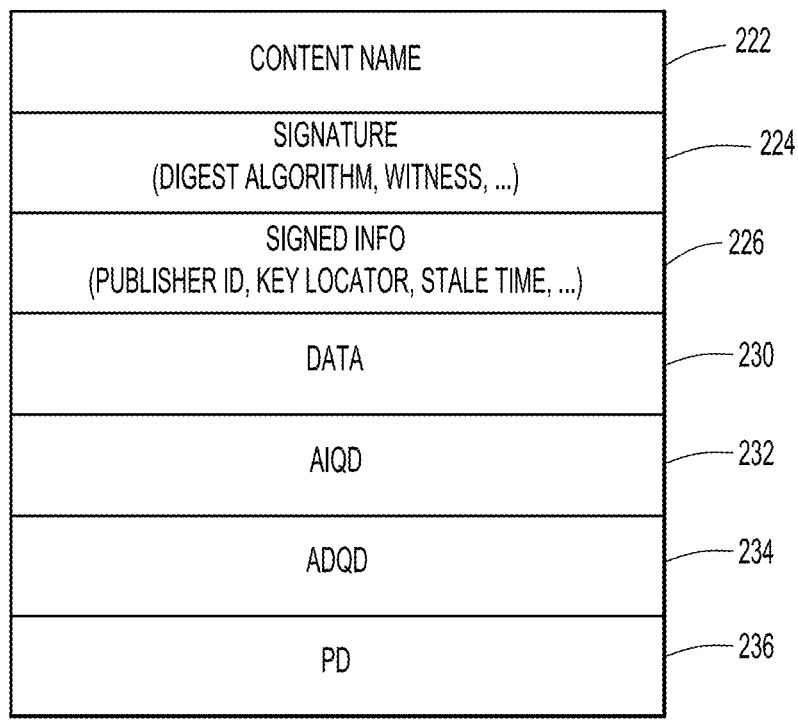
FIG. 2B is an illustration of a Data packet, according to an example embodiment.

With reference to FIG. 2B, there is an illustration of an example of a Data packet 220 (i.e., Data 220). Data 220 includes: content name 222 for the data contained in the Data; a signature 224, signed information 226; and data or content 230 carried in the Data. Data 220 also includes a field 232 to indicate the AIQD received in an Interest at a given data responder, a field 234 to indicate the ADQD, and an optional field 236 to indicate processing delay (PD) (i.e., turn-around time) experienced at the given data responder. ADQD may be represented as a multi-bit integer field that spans a dynamic range of ADQD values. In an embodiment, each of fields 232-236 is a 32-bit integer field, where the least-significant-bit (LSB) is one or several microseconds. Other bit-widths and LSB timing resolutions are possible.

Before embodiments to determine, track, report, and use Interest/Data packet queuing delay are described in detail, an example architecture and operation of one of network nodes 110 in which the embodiments may be implemented is described with reference to FIGS. 3-5.

Figure 3:
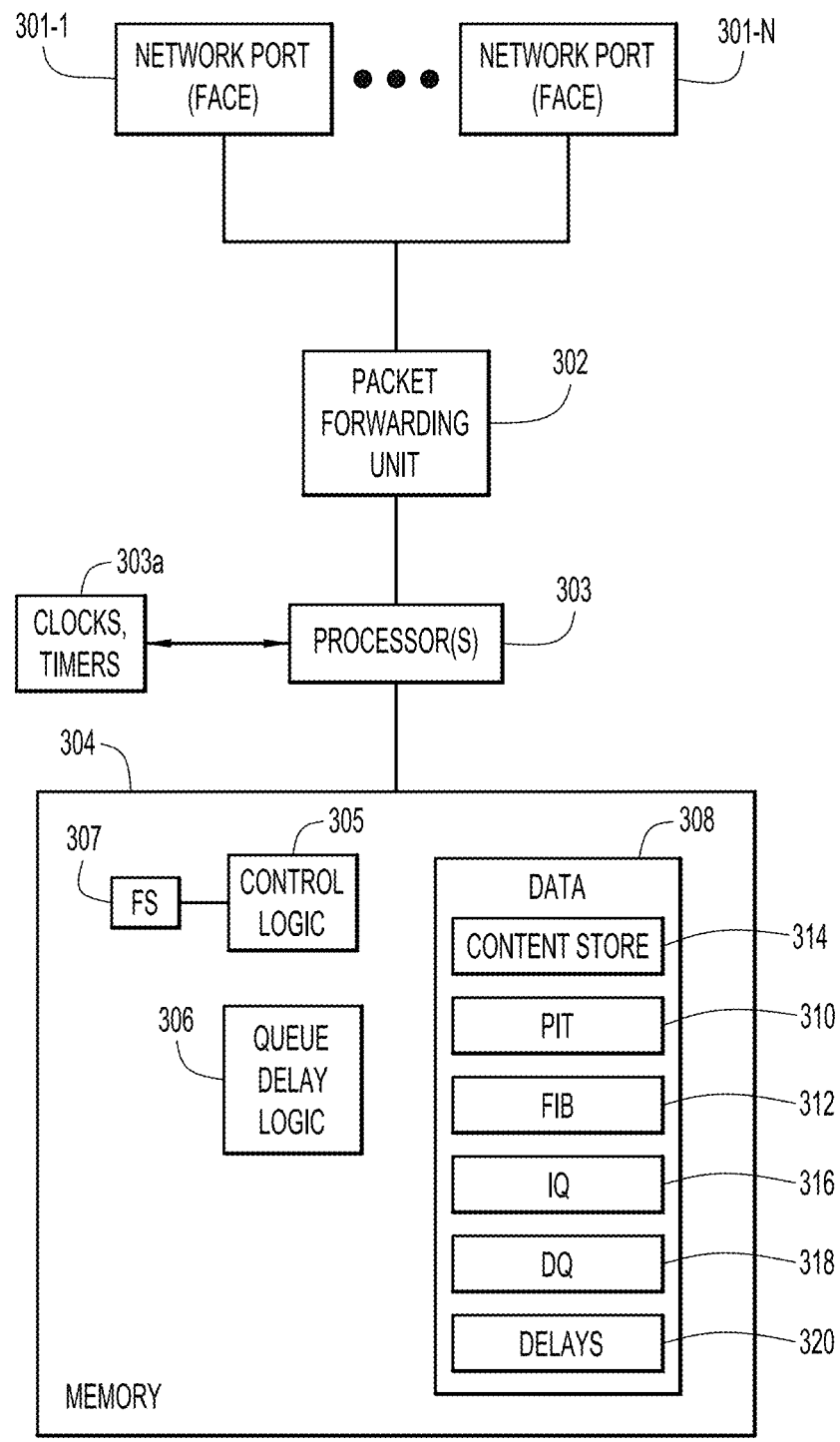
FIG. 3 is a block diagram of an ICN network device/node configured to operate according to the example embodiments presented herein, according to an embodiment.
Figure 4:
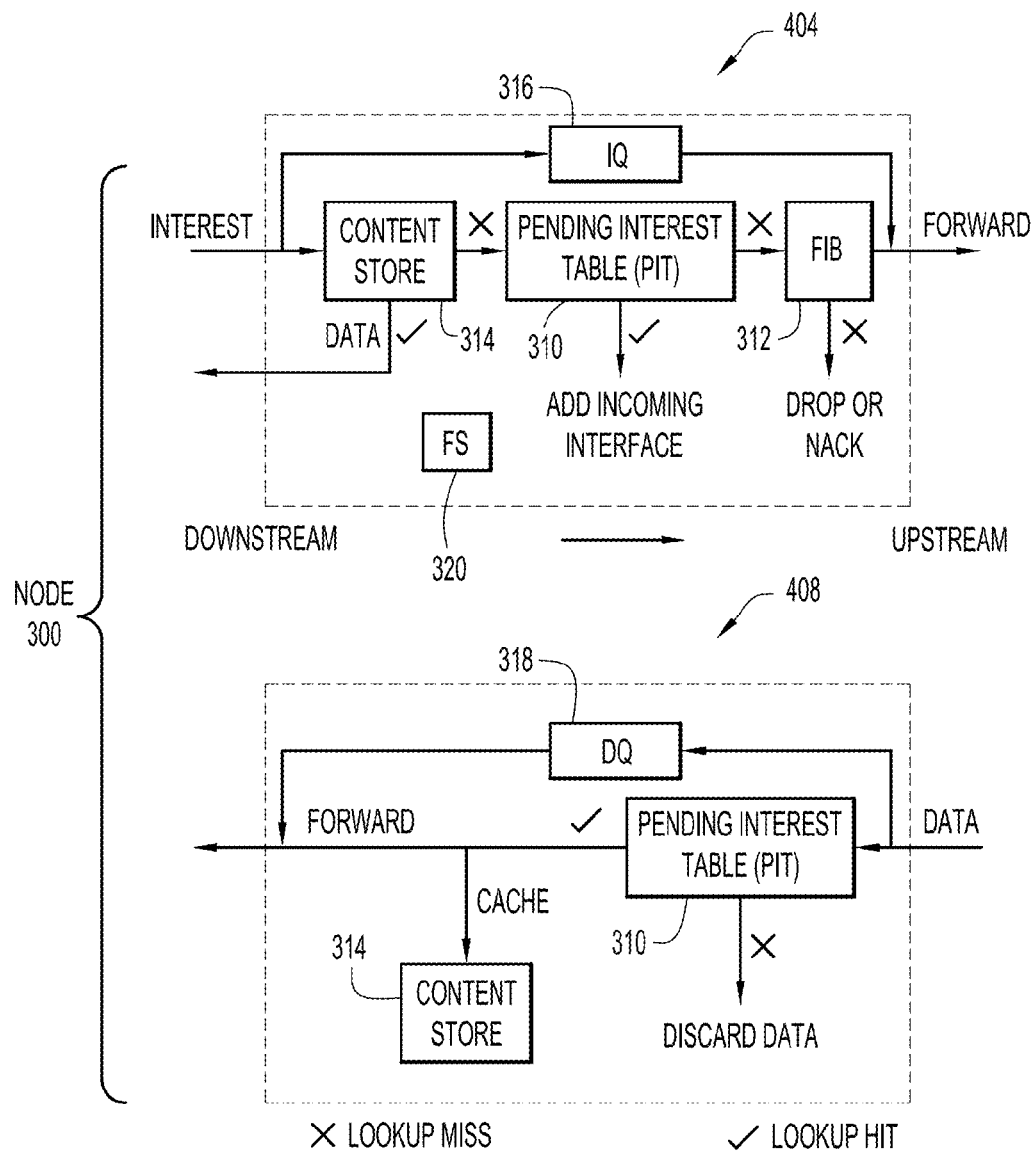
FIG. 4 is a block diagram of Interest and Data packet flow paths through the ICN network node of FIG. 3, according to an example embodiment.

Reference is now made to FIG. 3, which is a block diagram of an example ICN node or network device 300 representative of each of ICN nodes 110 in ICN environment 100. ICN node 300 may be a network device, such as a router or switch, which has Interest and Data packet forwarding capabilities, as well as computing/data processing capabilities to implement the queuing delay embodiments described herein. To this end, ICN node 300 includes a plurality of network ports or faces 301-1 through 301-N (also referred to as "interfaces") to receive and forward/transmit Interests and Data packets, a packet forwarding unit 302 to route the Interest and Data packets between the network ports/faces, a processor 303 (or multiple processors), memory 304, and clocks/timers 303a controlled and accessed by processor 303.

Memory 304 may include read only memory (ROM), random access memory (RAM), magnetic disk storage media devices, optical storage media devices, flash memory devices, electrical, optical, or other physical/tangible (non-transitory) memory storage devices. The processor 303 is, for example, a microprocessor or a microcontroller that executes instructions stored in memory. Thus, in general, memory 304 may include one or more tangible computer readable storage media (e.g., a memory device) encoded with software comprising computer executable instructions and when the software is executed (by the processor 304) it is operable to perform the operations described herein. For example, memory 304 stores Control logic 305 to provide overall control of network node 300 and Queue Delay logic 306 to perform queue delay determining, tracking, and reporting as described herein. Either Control logic 305 or Queue Delay logic 306 may include a Forwarding Strategy (FS) module 307 that operates in conjunction with packet forwarding unit 302 to implement an adaptive forwarding strategy, which determines whether, when, and where to forward each Interest packet.

Memory 304 also stores data 308 produced and/or used by logic 305-307. In certain embodiments, Data 308 includes one or more of data structures as shown in FIG. 3. A Pending Interest Table (PIT) 310 stores entries for pending/received Interests that have not yet been satisfied, where each entry includes the data name carried in the Interest together with node incoming and outgoing faces/interfaces traversed by the Interest. A Forwarding Information Base (FIB) 312 stores name-prefix based routing information. A Content Store (CS) 314 caches or stores Data that has been retrieved from a data responder (e.g., data producer 104 or other one of upstream nodes 110) in a most recent Interest/Data retrieval cycle, or has already been retrieved in a previous data retrieval cycle. Multiple Interest queues (IQ) 316 queue Interests received at node 300 for subsequent processing, including to be forwarded to next nodes. In an embodiment, Interest queues 316 include one or more separate outgoing (or forwarding) Interest queues associated with each of faces 301 from which the queued Interests are to be forwarded to a next hop. Also, Interest queues 316 may include one or more separate incoming Interest queues 316 associated with each of faces 301 on which the Interests are received. Multiple Data queues (DQ) 316 queue Data packets received at node 300 to be forwarded to next nodes. In an embodiment, Data queues 316 include one or more separate Data queues associated with each of faces 301 from which the queued Data packets are to be forwarded and/or from which the Data packets are received. Delay values 320 include determined local Interest/Data packet queuing delays, AIQD values, and ADQD values.

PIT 310 and FIB 312 together store state information, including node ingress and egress face information, for each Interest received and sent by ICN node 300 while traversing their respective paths in network 106 so that Data satisfying the Interest may trace the same path in reverse back to consumer 102 (i.e., the inverse path). This is referred to as "stateful forwarding" in an ICN network.

Processor 303 may use clocks/timers 303a to assist with measuring queuing delays in support of embodiments described herein.

The general operation of ICN node 300 is now described with reference to FIG. 4, with continued reference to FIG. 3. FIG. 4 shows an Interest flow 404 through node 300 in an upstream or forward direction from consumer 102 to producer 104, and a resulting Data flow 408 through the node in a downstream or reverse/inverse direction. When an Interest arrives at node 300, the node enqueues the Interest to one of queues 316, i.e., stores the Interest in the queue, where the Interest joins other enqueued Interests awaiting Interest processing. Also, node 300 checks Content Store 314 for matching data; if matching data exists, the node returns the Data packet on the interface/face of the node from which the Interest came. Otherwise node 300 looks up the name in PIT 310, and if a matching entry exists, it simply records the incoming interface of this Interest in the PIT entry.

In the absence of a matching PIT entry, node 300 determines an outgoing face among faces 310 on which to forward the Interest toward the data producer, and enqueues the Interest to one of Interest queues 316 (e.g., an outgoing Interest queue) associated with the determined outgoing face. The queued Interest remains in the one of Interest queues 316 awaiting a forwarding opportunity. Node 300 may determine the outgoing face on which to forward the Interest (and hence the associated Interest queue) based on forwarding face information already recorded in a PIT entry, and/or based on information in FIB 312 as well as the node's adaptive forwarding strategy as implemented by Forwarding Strategy (FS) module 320. When the Interest forwarding opportunity arises, node 300 dequeues the Interest from the one of Interest queues 316 (e.g., removes the Interest from the queue) and forwards the Interest toward the data producer via the associated one of outgoing faces 301. Note that the dequeuing operation may not actually remove the Interest from the queue, but may simply access the Interest and copy it to the outgoing face. When node 300 receives multiple Interests for the same name from the downstream nodes, in one embodiment the node may forward only the first of the received Interests upstream toward data producer 104, and drop the other duplicative Interests after recording the incoming face in the corresponding PIT entry. FIB 312 is populated by a name-prefix based routing protocol, and can have multiple output interfaces for each prefix.

Forwarding Strategy module 320 may decide to drop or negatively acknowledge an Interest in certain situations, e.g., if all upstream links are congested or the Interest is suspected to be part of a malicious attack. For each Interest, Forwarding Strategy module 320 may retrieve the longest-prefix matched entry from FIB 312, and decide when and where to forward the Interest. Content Store 314 is a temporary cache of Data packets node 300 has received. Because a Data packet is meaningful independent of where it comes from or where it is forwarded, it can be cached to satisfy future Interests.

When a Data packet arrives at node 300, the node may find a matching PIT entry listing all downstream faces among faces 301 from which the Data packet is to be forwarded, and enqueues the Data packet to one or more of Data Queues 318 associated with each of the downstream faces recorded in the PIT entry. In the one or more of Data Queues 318 the Data packet joins other enqueued Data packets awaiting Data packet processing and forwarding. When the opportunity arises, node 300 dequeues the Data packet from the one or more of Data Queues 318, and forwards the Data packet on all of the downstream faces associated with the queues. The dequeuing operation may simply access the Data packet and copy it to an outgoing face, not actually remove the Data packet from the queue. Node 300 may remove that PIT entry, and optionally caches the Data in Content Store 314. Data packets always take the reverse path of Interests, and, in the absence of packet loss, one Interest packet results in one Data packet that satisfies the Interest on each link, providing flow balance. To fetch large content objects that comprise multiple packets, Interests provide a similar role in controlling traffic flow as TCP ACKs in the Internet: a fine-grained feedback loop controlled by the consumer of the data. Neither Interest nor Data packets carry any host or interface addresses. ICN routes forward Interest packets toward data producers based on the names carried in the packets, and forward Data packets to consumers based on the PIT state information set up by the Interests at each hop. This Interest/Data packet exchange symmetry allows a hop-by-hop control loop.

Figure 5:
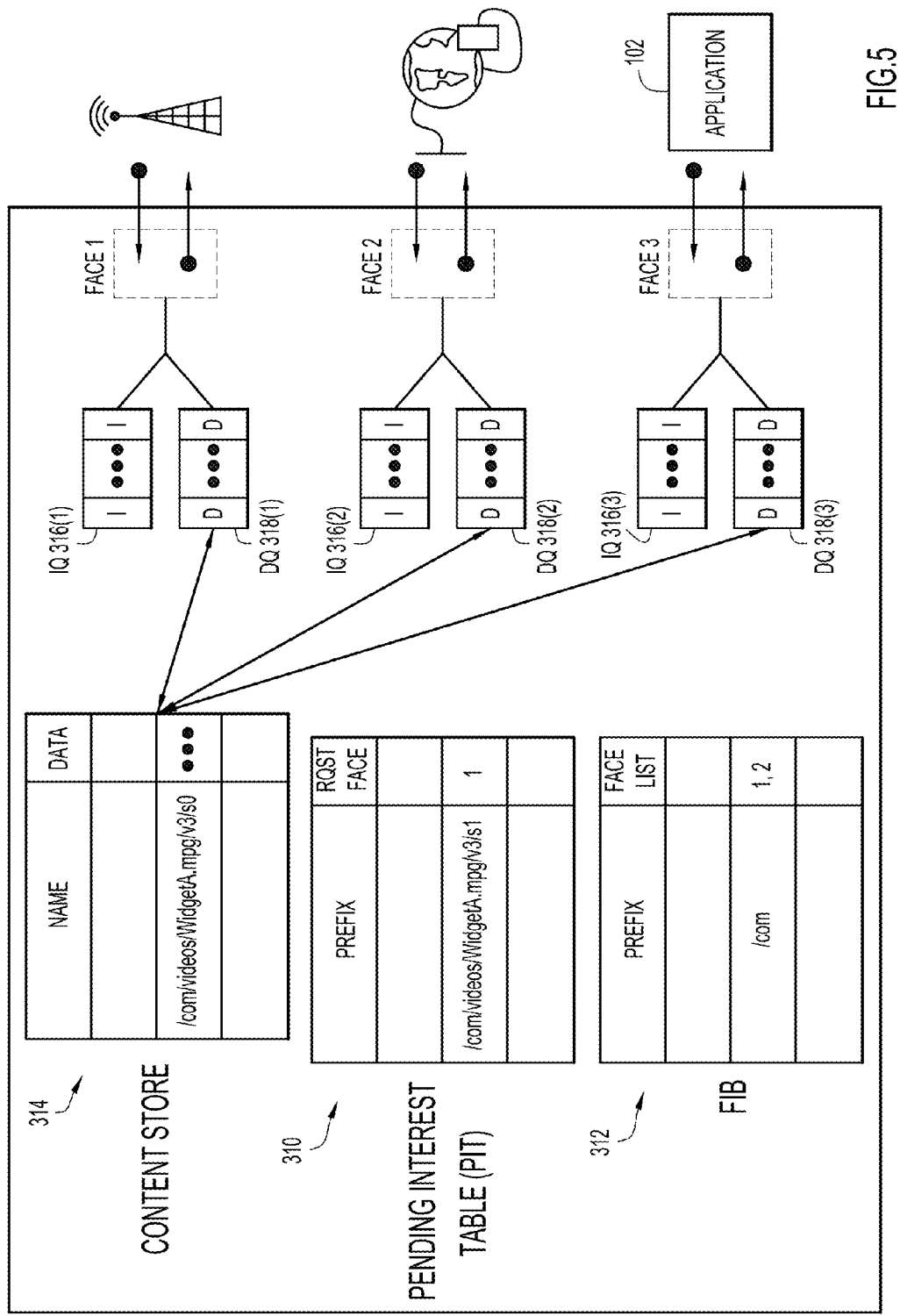
FIG. 5 is a detailed illustration of data structures corresponding to the ICN network node data structures introduced in FIG. 3, according to an example embodiment.

With reference to FIG. 5, there is depicted a detailed illustration of example data structures corresponding to the node data structures introduced in connection with FIG. 3. Also depicted in FIG. 5 are example node interfaces/faces F1-F3 for receiving and sending Interests and Data to satisfy the Interest. Ingress and egress faces F1-F3 for a given Interest and Data corresponding to that Interest are tracked in PIT 310 and FIB 312.

In PIT 310, each PIT entry, which is populated based on a corresponding Interest, may include a name prefix carried in the Interest, and a node interface/face from which the Interest was received.

In FIB 312, each FIB entry may include the above-mentioned prefix, a list of node interfaces/faces on which the Interest associated with a given data object name may be forwarded.

In Content Store 314, each entry may include a name of the content in that entry, the data content, and, in some embodiments, an Actual Data Size of the data content, in bytes, for example.

Data structures in node 300 may also include an index (not shown) that points to corresponding entries for a given Interest/Data in each of Content Store 314, PIT 310, and FIB 312.

Data queues 318 store queued Data packets received from, and to be forwarded to, the associated faces F1-F3 and content store 314. Interest queues 316 store queued Interests received from, and to be forwarded to, the associated faces F1-F3.

Various embodiments directed to determining, tracking, reporting, and using accumulated Interest/Data packet queuing delay are summarized in methods described below in connection with FIGS. 6-8.

Figure 6:
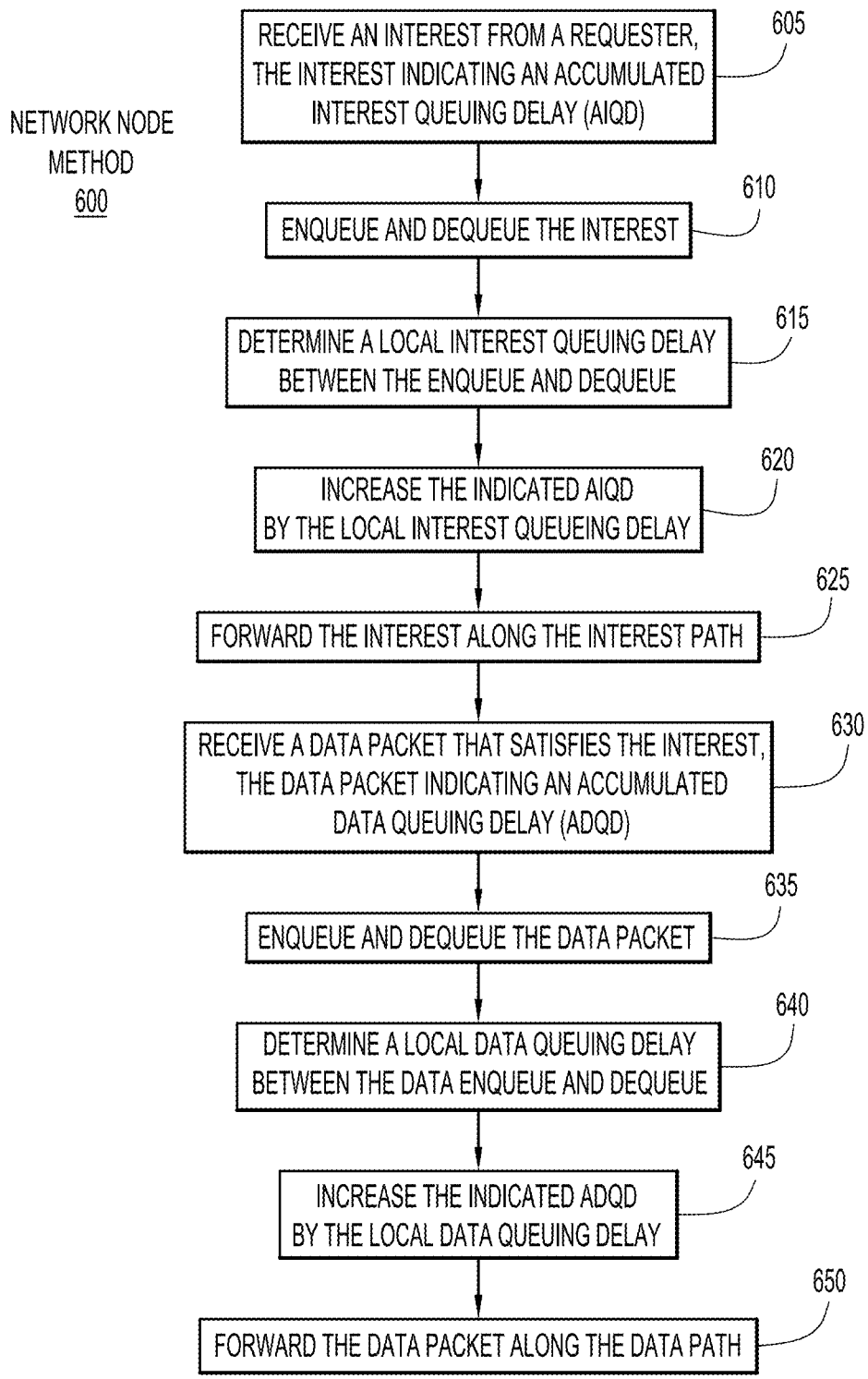
FIG. 6 is a flowchart of a method of determining, tracking, and reporting Interest and Data packet queuing delays performed in the node of FIG. 3, according to an example embodiment.

With reference to FIG. 6, a flowchart is shown for a method 600 of determining, tracking, and reporting Interest and Data packet queuing delays that is performed, for example, in node 300 (the "node") shown in the previous figures. Reference is also made to FIGS. 1-5 for purposes of the description of the flowchart of FIG. 6.

Node 300 implements stateful forwarding of packets such that the node stores state information that associates incoming and outgoing faces of the node traversed by an Interest with a name of data requested by the Interest, to enable (i) forwarding of the Interest along the path to the data responder (e.g., data producer 104), and (ii) forwarding of a Data packet that satisfies the Interest along a data path in reverse to consumer 102.

At 605, node 300 receives an Interest as the Interest traverses an Interest path from consumer 102 to a data responder. The Interest includes field 208 to indicate the AIQD experienced by the Interest thus far along the Interest path.

At 610, node 300 determines which of face(s) 301 from which to forward the received Interest, and then enqueues the Interest to one of the outgoing/forwarding) Interest queues 316 associated with the determined forwarding face.

At 615, node 300 determines a local Interest queuing delay between the enqueue operation and an anticipated dequeue operation. Any known or hereafter developed method to determine queuing delay may be used at 615. For example, a queuing method that maintains a queue depth (in bytes) may be used to estimate the queuing delay at the time the Interest is enqueued based on a current queue depth and an Interest transmission link bandwidth. Also, methods that in a TCP/IP network are used to provide Explicit Congestion Notification (ECN) can similarly provide an estimate by assigning a queuing delay Interests that would have been ECN marked, using queue size threshold values configured for ECN as a baseline queuing delay. Additionally, queuing delay may be measured directly using timers as a difference between a time when the Interest is enqueued and a time when the Interest is dequeued.

At 620, node 300 increases the indicated AIQD by the determined local Interest queueing delay. That is, the determined local Interest queuing delay is added to the indicated AIQD.

At 625, node 300 dequeues the Interest from the one of Interest queues 316 and forwards the Interest along the Interest path. In an alternative embodiment, node 300 may determine the local Interest queuing delay after the Interest is dequeued.

At 630, node 300 receives a Data packet that satisfies the Interest as the Data packet traverses a data path in reverse of the Interest path, i.e., from the data responder to consumer 102. The Data packet includes field 232 to indicate the total AIQD experienced by the corresponding Interest along the Interest path, field 234 to indicate the ADQD experienced by the Data packet thus far along the data path, and optionally field 236 to indicate the processing delay of the data responder.

At 635, node 300 enqueues and then dequeues the data packet to and from one of Data queues 318, respectively.

At 640, node 300 determines a local data queuing delay between the data enqueue and dequeue operations.

At 645, node 300 increases the indicated ADQD by the local data queuing delay.

At 650, node 300 forwards the Data packet along the data path.

Figure 7:
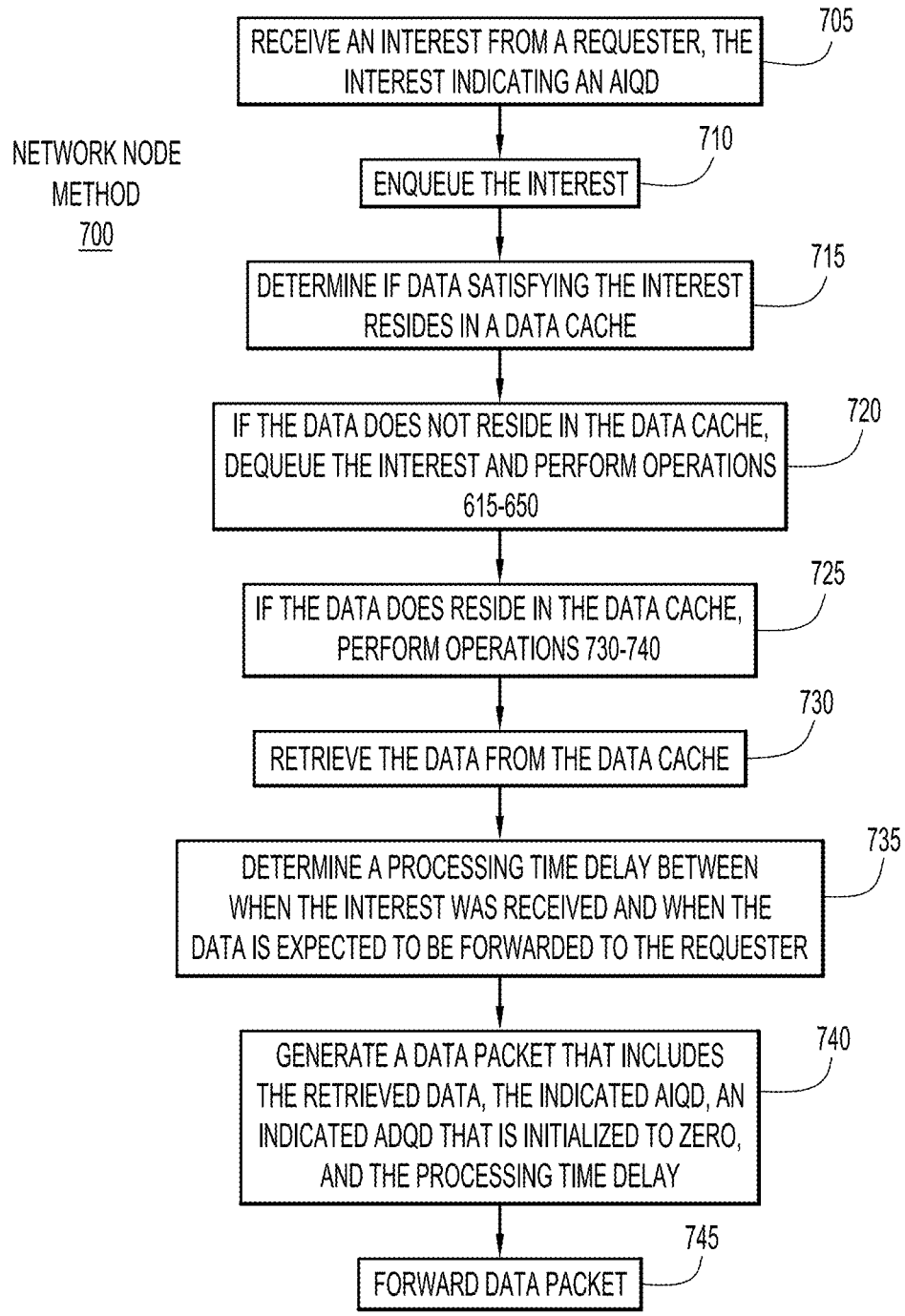
FIG. 7 is a flowchart of a method of determining, tracking, and reporting accumulated Interest and Data packet queuing delays that is performed in the node of FIG. 3, when the network node also operates as a data responder, according to an example embodiment.

With reference to FIG. 7, a flowchart is shown of method 700 for determining, tracking, and reporting accumulated Interest and Data packet queuing delays that is performed in node 300, when the network node also operates as a data responder. Reference is also made to FIGS. 1-5 for purposes of the description of the flowchart of FIG. 7.

At 705, similar to 605 in FIG. 6, node 300 receives an Interest that originated at consumer 102. The Interest indicates an AIQD experienced by the Interest thus far.

At 710, node 300 enqueues the Interest to one of Interest queues 316.

At 715, node 300 determines if data satisfying the Interest resides in content store 314 (i.e. in data cache 314).

At 720, if it is determined that the data does not reside in content store 314, node 300 dequeues the Interest and performs operations 615-650 of method 600 described above in connection with FIG. 6 to forward the Interest to a next node.

At 725, if it is determined that the data does reside in content store 314, node 300 performs next operations 730-740.

At 730, node 300 retrieves the data from content store 314.

At 735, node 300 determines a processing delay between the time when the Interest was received and the time when the Data packet responsive to the Interest is expected to be forwarded from the node (now the data responder) to consumer 102.

At 740, node 300 generates a Data packet that includes the retrieved data, the indicated AIQD copied from the Interest, an indicated ADQD that is initialized to zero, and the processing delay.

At 745, node 300 forwards the Data packet to consumer 102 on a data path that is a reverse of the Interest path for that Data packet.

Improvements in congestion control based on reported accumulated Interest/Data delays are now described. In conventional ICN networks, assessment of congestion is performed relative to each network device queue based on separate parameters that may or may not provide useful or correct assessment of congestion. Also, a lack of dynamic range and granularity in the representation of delays (e.g., delays may be represented as a single bit) forces the end-to-end transport to assess congestion by packet counting, resulting in less accurate congestion measurement and consequent slower response to changes in congestion. Advantageously, embodiments presented herein make it possible to disentangle three independent contributors to round-trip Interest/Data packet exchange time, namely: the propagation time, application service time (i.e., processing delay), and the accumulated round-trip (Interest/Data packet) queuing delay. If the round-trip Interest/Data packet exchange time increases (or decreases) without affecting the round-trip accumulated queuing delay, this indicates either a change in the propagation time or a change in the processing delay rather than increased congestion. Conversely, if the round-trip accumulated queuing delay increases, this will be reflected in the round-trip time for the Interest/Data packet exchange, but the queuing delay can be separately accounted for.

In the absence of explicit signaling/measurement as described herein, congestion in a distributed system essentially may be detected by one of two means: (1) packet loss; and (2) an increase in round-trip time. For packet loss, it is difficult to determine the difference between packet loss due to congestion and packet loss due to many other causes, such as misrouting, link errors, and the like. For increase in round-trip time, it is difficult to determine the difference between path changes or increased processing delay and increased round-trip accumulated queuing delay. Using embodiments presented herein, a congestion control algorithm may respond directly to an increase or a decrease in the round-trip accumulated queuing delay, and do so in proportion to a magnitude of that change rather than depending on, e.g., a single bit congestion indicator. A larger increase in round-trip accumulated queuing delay from successive Interest/Data exchanges indicates a need to slow down more quickly than a small increase in round-trip accumulated queuing delay. This results in improved congestion control that provides better performance than conventional congestion control, which needs multiple packets and a way to "count" or otherwise threshold Explicit Congestion Notification (ECN) marks, or that only has a fixed decrease coefficient (e.g., 0.5) and conservative increase (one packet per RTT). Congestion control based on round-trip accumulated queuing delay as reported to a consumer in embodiments described herein may both safely ramp up more quickly, and be either less or more conservative in ramping down due to the dynamic range provided through the reported round-trip accumulated queuing delay.

Figure 8:
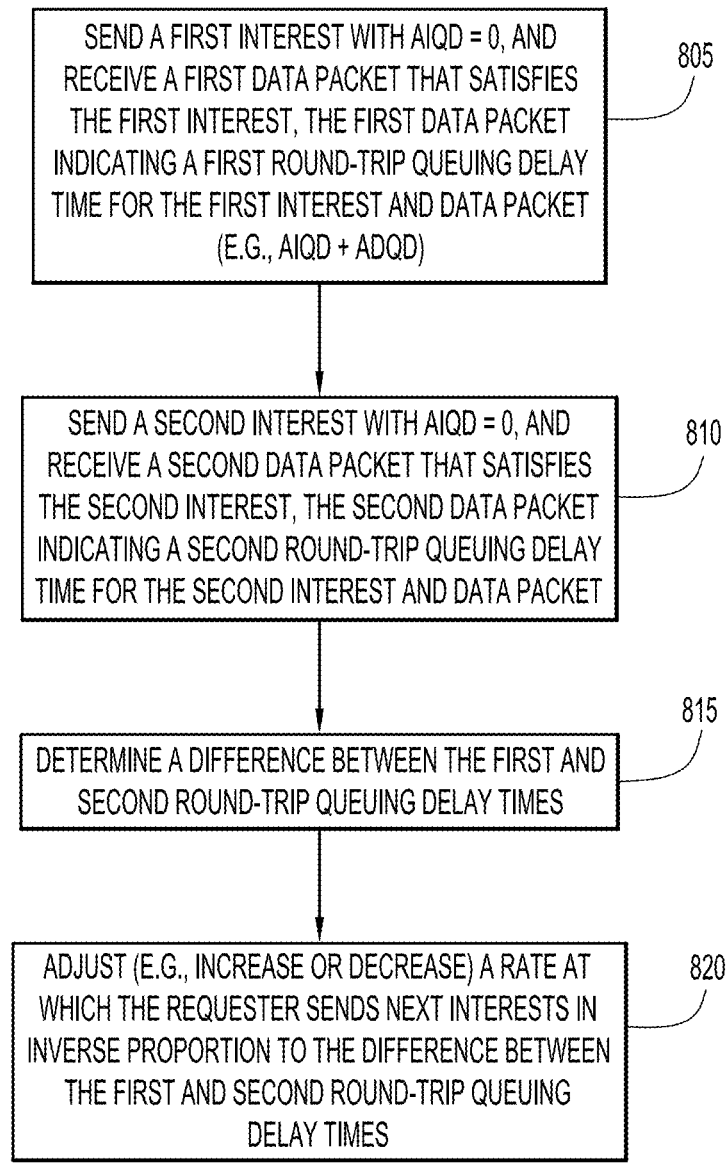
FIG. 8 is a flowchart of a method of performing congestion control at a consumer of FIG. 3, according to an example embodiment.

With reference to FIG. 8, there is a flowchart of a method 800 for performing congestion control at a consumer. Reference is made to FIGS. 1-5 for purposes of the description of FIG. 8.

At 805, consumer 102 sends a first Interest with the indicated AIQD=0, and starts a timer when the first Interest is sent. Consumer receives a first data packet that satisfies the first Interest, and stops the timer. The first data packet includes AIQD field 232 and AIQD field 234, which together indicate a first round-trip accumulated queuing delay (e.g., AIQD+ADQD) for the first Interest and Data packet exchange. Additionally, the first data packet may include PTD field 236. The timer indicates a first round-trip time for the first Interest/Data packet exchange.

At 810, consumer 102 sends a second Interest with the indicated AIQD=0, and restarts the timer. Consumer 102 receives a second data packet that satisfies the second Interest, and stops the timer. AIQD field 232 and ADQD field 234 of the second data packet indicate a second round-trip accumulated queuing delay for the second Interest and Data packet exchange. The timer indicates a second round-trip time for the second Interest/Data packet exchange.

At 815, consumer 102 determines a difference between the first and second round-trip queuing delay times.

At 820, consumer 102 performs congestion control based on the determined difference between the first and second round-trip accumulated queuing delays. For example, consumer 102 adjusts (e.g., increases or decreases) a rate at which the requestor sends next Interests in inverse proportion to the difference between the first and second round-trip accumulated queuing delays. Changes in round-trip accumulated queuing delays reported with a fine-grained granularity over an expansive dynamic range correspondingly result in proportional fine-grained changes in Interest (and Data packet) transmission/forwarding rates over that dynamic range.

In addition, consumer 102 may separate the first and second round-trip times from their corresponding first and second round-trip queuing delay times, and use that information to make further congestion control decisions, as described above.

Figure 9:
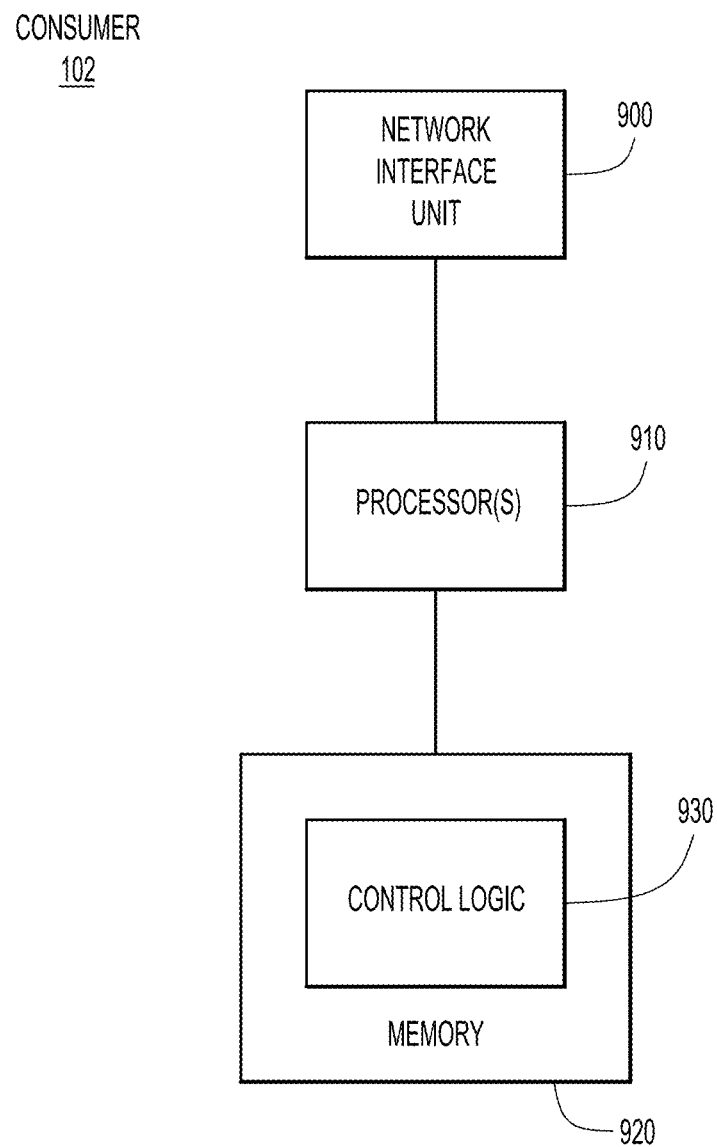
FIG. 9 is a block diagram of a consumer device shown in FIG. 1, according to an example embodiment.

With reference to FIG. 9, a block diagram is shown for a device that may serve or operate as a consumer 102. Consumer 102 includes a network interface unit 900 configured to enable network communications to send Interests and receive Data packets to and from network 106. One or more processors 910 are provided that execute software stored in memory 920. The processor(s) 910 is/(are) for example, a microprocessor or microcontroller. To this end, the memory 920 stores instructions for control logic 930. When the one or more processors 910 execute control logic 930, consumer 102 performs the operations described herein, including operations for congestion control method 800.

Memory 920 may comprise read only memory (ROM), random access memory (RAM), magnetic disk storage media devices, optical storage media devices, flash memory devices, electrical, optical, or other physical/tangible memory storage devices. Thus, in general, the memory 920 may comprise one or more tangible (non-transitory) computer readable storage media (e.g., a memory device) encoded with software comprising computer executable instructions and when the software is executed (by the processor(s) 910) it is operable to perform the operations described herein.

In summary, the Interest/Data exchange paradigm of ICN provides an opportunity for improvements to congestion control in ICN. The improvements include determining, tracking, reporting, and using accumulated Interest/Data packet queueing delays. Indications of accumulated Interest/Data packet queueing delay provide accurate indications of congestion with increased granularity and dynamic range, which may be used to enhance congestion control in ICN.

In one form, a method is provided comprising: at a network device among network devices configured to perform information centric networking (ICN) in an ICN network: receiving an Interest from a consumer as the Interest traverses an Interest path to a data responder, the Interest requesting data by name and indicating an accumulated Interest queuing delay experienced by the Interest on the Interest path; enqueuing the Interest to an Interest queue and dequeuing the Interest from the Interest queue; determining a local Interest queuing delay between the enqueing and dequeuing; increasing the indicated accumulated Interest queuing delay in the Interest by the local Interest queueing delay; and forwarding the Interest along the Interest path.

In another form, an apparatus is provided comprising: a plurality of network faces to send and receive information centric networking (ICN) packets to and from an ICN network; a packet forwarding unit to forward the ICN packets between the network faces; and a processor coupled to the forwarding unit and the network faces, wherein the processor: receives an Interest from a consumer as the Interest traverses an Interest path to a data responder, the Interest requesting data by name and indicating an accumulated Interest queuing delay experienced by the Interest on the Interest path; enqueues the Interest to an Interest queue and dequeues the Interest from the Interest queue; determines a local Interest queuing delay between the enqueue and dequeue operations; increases the indicated accumulated Interest queuing delay in the Interest by the local Interest queueing delay; and forwards the Interest along the Interest path.

In yet another form, a computer program product is provided. The computer program product includes computer readable storage media encoded with instructions that, when executed by a processor, cause the processor to receive an Interest from a consumer as the Interest traverses an Interest path to a data responder, the Interest requesting data by name and indicating an accumulated Interest queuing delay experienced by the Interest on the Interest path; enqueue the Interest to an Interest queue and dequeue the Interest from the Interest queue; determine a local Interest queuing delay between the enqueue and dequeue operations; increase the indicated accumulated Interest queuing delay in the Interest by the local Interest queueing delay; and forward the Interest along the Interest path.

The above description is intended by way of example only.

What is claimed is:

1. A method comprising:
at a network device among network devices comprising an Interest path configured to perform information centric networking (ICN) in an ICN network:

receiving an Interest from a consumer as the Interest traverses the Interest path to a data responder, the Interest requesting data by name and indicating an accumulated Interest queuing delay experienced by the Interest on the Interest path, wherein the accumulated Interest queuing delay is a summation of local Interest queuing delays experienced by the Interest in respective ones of the network devices;

enqueuing the Interest to an Interest queue and dequeuing the Interest from the Interest queue;

determining a local Interest queuing delay between the enqueuing and dequeuing;

increasing the indicated accumulated Interest queuing delay in the Interest by the local Interest queueing delay;

determining whether data satisfying the Interest resides in a data cache; and if it is determined that data satisfying the Interest resides in the data cache:
retrieving the data satisfying the Interest from the data cache;
generating a data packet that includes the retrieved data, the indicated accumulated Interest queuing delay, and an indicated accumulated data queuing delay that is initialized to zero; and
forwarding the data packet to the consumer along a path that is a reverse of the Interest path.

2. The method of claim 1, further comprising:
receiving a data packet that satisfies the Interest as the data packet traverses a data path in reverse of the Interest path, the data packet indicating an accumulated data queuing delay experienced by the data on the data path;
enqueuing the data packet to a data queue and dequeuing the data packet from the data queue;
determining a local data queuing delay between the enqueuing of the data packet and dequeuing of the data packet;
increasing the indicated accumulated data queuing delay in the data packet by the local data queuing delay; and
forwarding the data packet along the data path.

3. The method of claim 2, further comprising:
storing state information that associates incoming faces and outgoing faces of the network device traversed by the Interest with the name of the data to enable forwarding of the Interest along the path to the data responder and the forwarding of the data packet along the data path in reverse to the consumer.

4. The method of claim 2, wherein the data packet indicates the accumulated Interest queuing delay, the accumulated data queuing delay, a content name for the data, a signature, and signed information including a publisher identification and a key locator.

5. The method of claim 4, wherein:
the Interest includes a multiple-bit field to represent a range of different accumulated Interest queuing delay values from a first minimum value to a first maximum value; and
the data packet includes a multiple-bit field to represent a range of different accumulated data queuing delay values from a second minimum value to a second maximum value.

6. The method of claim 2, wherein the data packet also indicates a processing delay of the data producer, wherein the processing delay represents a time difference between a first time when the producer received the Interest from the Interest path and a second time when the producer provided the data packet to the data path.

7. The method of claim 1, further comprising:
if it is determined that data satisfying the Interest does not reside in the data cache, forwarding the Interest along the Interest path.

8. The method of claim 7, wherein if it is determined that data satisfying the Interest resides in the data cache, the method further comprises:
determining a processing delay between a time when the Interest was received and a time when the data packet is to be forwarded,
wherein the generating includes generating the data packet to include a field that indicates the processing delay.

9. An apparatus comprising:
a plurality of network faces comprising an Interest path to send and receive information centric networking (ICN) packets to and from an ICN network;
a packet forwarding unit to forward the ICN packets between the network faces; and
a processor coupled to the forwarding unit and the network faces, wherein the processor:
receives an Interest from a consumer as the Interest traverses the Interest path to a data responder, the Interest requesting data by name and indicating an accumulated Interest queuing delay experienced by the Interest on the Interest path, wherein the accumulated Interest queuing delay is a summation of local Interest queuing delays experienced by the Interest in respective ones of the network devices;
enqueues the Interest to an Interest queue and dequeues the Interest from the Interest queue;
determines a local Interest queuing delay between the enqueue and dequeue operations;
increases the indicated accumulated Interest queuing delay in the Interest by the local Interest queueing delay;
determines whether data satisfying the Interest resides in a data cache; and
if it is determined that data satisfying the Interest resides in the data cache:
retrieves the data satisfying the Interest from the data cache;
generates a data packet that includes the retrieved data, the indicated accumulated Interest queuing delay, and an indicated accumulated data queuing delay that is initialized to zero; and
forwards the data packet to the consumer along a path that is a reverse of the Interest path.

10. The apparatus of claim 9, wherein the processor further:
receives a data packet that satisfies the Interest as the data packet traverses a data path in reverse of the Interest path, the data packet indicating an accumulated data queuing delay experienced by the data on the data path;
enqueues the data packet to a data queue and dequeues the data packet from the data queue;
determines a local data queuing delay between the enqueue and dequeue operations of the data packet;
increases the indicated accumulated data queuing delay in the data packet by the local data queuing delay; and
forwards the data packet along the data path.

11. The apparatus of claim 10, wherein the processor further:
stores state information that associates incoming faces and outgoing faces of the network device traversed by the Interest with the name of the data to enable forwarding of the Interest along the path to the data responder and the forwarding of the data packet along the data path in reverse to the consumer.

12. The apparatus of claim 10, wherein the received data packet indicates the accumulated Interest queuing delay, the accumulated data queuing delay, a content name for the data, a signature, and signed information including a publisher identification and a key locator.

13. The apparatus of claim 12, wherein:
the Interest includes a multiple-bit field to represent a range of different accumulated Interest queuing delay values from a first minimum value to a first maximum value; and
the data packet includes a multiple-bit field to represent a range of different accumulated data queuing delay values from a second minimum value to a second maximum value.

14. The apparatus of claim 9, wherein the processor further;
if it is determined that data satisfying the Interest does not reside in the data cache, forwards the Interest along the Interest path.

15. The apparatus of claim 14, wherein if it is determined that data satisfying the Interest resides in the data cache, the processor further:
determines a processing delay between a time when the Interest was received and a time when the data packet is to be forwarded,
wherein the processor generates the data packet to include a field that indicates the processing delay.

16. A non-transitory tangible computer readable storage media encoded with instructions that, when executed by a processor of a network device among network devices comprising an Interest path configured to perform information centric networking (ICN) in an ICN network, cause the processor to:
receive an Interest from a consumer as the Interest traverses the Interest path to a data responder, the Interest requesting data by name and indicating an accumulated Interest queuing delay experienced by the Interest on the Interest path, wherein the accumulated Interest queuing delay is a summation of local Interest queuing delays experienced by the Interest in respective ones of the network devices;
enqueue the Interest to an Interest queue and dequeue the Interest from the Interest queue;
determine a local Interest queuing delay between the enqueue and dequeue operations;
increase the indicated accumulated Interest queuing delay in the Interest by the local Interest queueing delay;
determine whether data satisfying the Interest resides in a data cache; and
if it is determined that data satisfying the Interest resides in the data cache:
retrieve the data satisfying the Interest from the data cache;
generate a data packet that includes the retrieved data, the indicated accumulated Interest queuing delay, and an indicated accumulated data queuing delay that is initialized to zero; and
forward the data packet to the consumer along a path that is a reverse of the Interest path.

17. The computer readable storage media of claim 16, further comprising instructions to cause the processor to:
receive a data packet that satisfies the Interest as the data packet traverses a data path in reverse of the Interest path to the consumer, the data packet indicating an accumulated data queuing delay experienced by the data on the data path;
enqueue the data packet to a data queue and dequeue the data packet from the data queue;
determine a local data queuing delay between the data enqueue and dequeue operations;
increase the indicated accumulated data queuing delay in the data packet by the local data queuing delay; and
forward the data packet along the data path.

18. The computer readable storage media of claim 17, wherein the data packet indicates the accumulated Interest queuing delay, the accumulated data queuing delay, a content name for the data, a signature, and signed information including a publisher identification and a key locator.

19. The computer readable storage media of claim 18, wherein:
the Interest includes a multiple-bit field to represent a range of different accumulated Interest queuing delay values from a first minimum value to a first maximum value; and
the data packet includes a multiple-bit field to represent a range of different accumulated data queuing delay values from a second minimum value to a second maximum value.

20. The computer readable storage media of claim 16, further comprising instructions to cause the processor to;
if it is determined that data satisfying the Interest does not reside in the data cache forward the Interest along the Interest path.

\* \* \* \* \*